Nov. 3, 1936.   H. E. METCALF   2,059,473
SOUND RECORDING SYSTEM
Filed Dec. 15, 1930
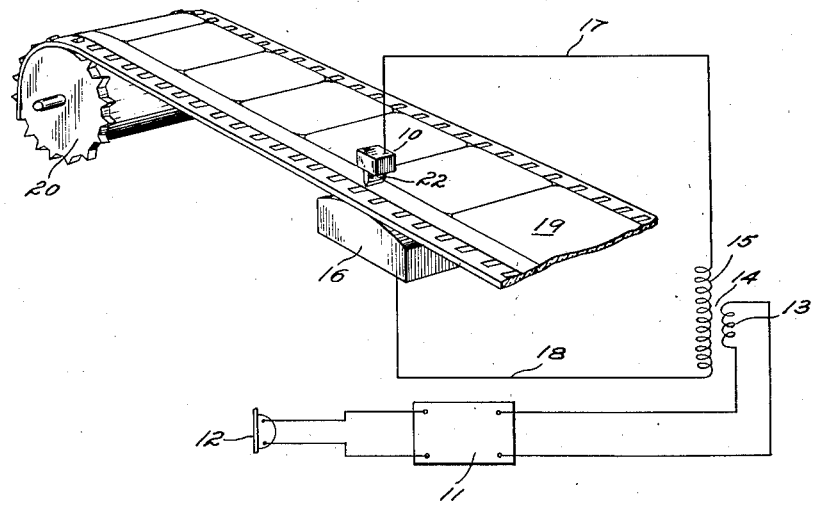
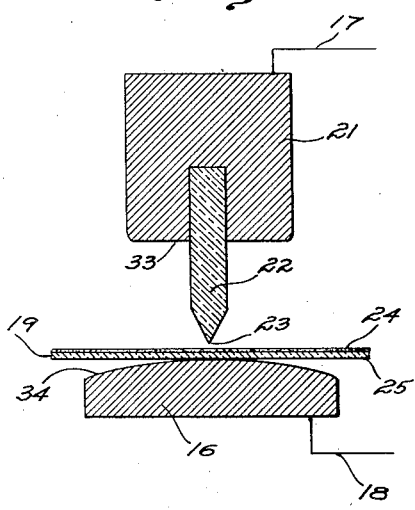
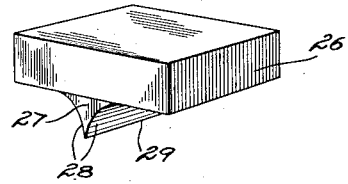
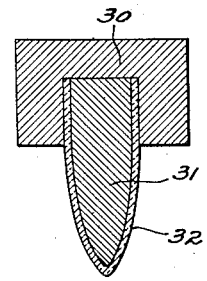
Inventor
Herbert E. Metcalf
by John Flam
Attorney Patented Nov. 3, 1936

2,059,473

UNITED STATES PATENT OFFICE 2,059,473

SOUND RECORDING SYSTEM

Herbert E. Metcalf, San Francisco, Calif.

Application December 15, 1930, Serial No. 502,580

13 Claims. (Cl. 179—100.3)

My invention relates to sound recording systems in which electrical energy acts directly upon a sensitive surface to produce a sound track or record and is a continuation in part of my prior patent application, Serial No. 425,811, filed February 4, 1930. The recording of sound as carried on particularly in the production of talking pictures consists in directing a beam of light against a narrow region near the edge of the film, and varying either the intensity or the direction of this light beam in accordance with the vibratory sound impulses to be recorded.

This method in recording sound usually involves vibrating moving parts such as shutters, sometimes termed light valves, or vibrating mirrors. These moving parts possess a natural period of vibration of their own, and therefore are incapable of recording accurately all impressed frequencies, but accentuate that range of frequencies which approaches the inherent vibratory characteristic of the shutters or mirrors.

Further, such vibrating mechanisms must be carefully mounted on a support which is insulated against mechanical shocks and must further be operated in as quiet and vibration free a region as possible. This unfits such mechanisms for direct mounting on the camera of a talking picture recording system, since vibration to the camera or gears would immediately communicate themselves to the shutter or mirror systems, resulting in impressing on the film vibrations which did not arrive through the microphone and amplifiers in the normal manner.

Aside from the recording devices employing moving mechanical parts, the only other method known to me which has attained any practical measure of success is that of recording by the use of a glow discharge. This discharge is caused to vary in brightness synchronously with the sound to be recorded, and the light from the discharge is caused to fall in a restricted region on the moving film. Variations in the intensity of light from the discharge thereby produce marks upon the film. This latter method has not been completely satisfactory for a number of reasons, first among them being the inability to secure through the use of such a glow discharge effective light to effect the photographic film in the advantageous exposure range. Further difficulties have been experienced in adequately confining the light from such a glow discharge to a region on the film which is sufficiently short in the direction of film motion.

It is well known that in order to record accurately the higher frequency and overtones of an impressed sound, the recording means should produce, at any given instant, a mark on the film whose dimensions, in the direction of film travel, should be as small as possible. This is done by providing in the optical system a slit or other defining means for narrowing a beam of light. And as is well known, this narrowing cannot be continued indefinitely without reaching the limit at which diffraction occurs and multiple images are formed.

By the method of my invention, I am able to mark on film a sound track whose longitudinal dimension at any given instant is extremely small. Thus it is possible by my method to accurately record sounds of unusually high frequency.

I am further able to dispense with vibratory moving parts, and can thus produce a device which will record with equal efficiency sounds of any frequency within the entire range of audibility, which has not been the case where vibrating parts were used. Furthermore, having no vibrating parts, my device may be mounted directly on a camera or other mechanism without the disturbances previously experienced due to gear vibration and the like.

I accomplish these and other advantageous results by employing as a means for effecting the emulsion of the photographic film or other recording medium an intense electrostatic field maintained between the film emulsion and a novel structure adjacent thereto, which I will hereafter describe in greater detail.

This field causes ionization in the air or other gas adjacent to the film surface and this ionization together with the effects of the electrostatic field on the emulsion itself causes a change in the emulsion substance which on development produces marks or sound track.

In general, it has long been known that it was possible to effect a photographic emulsion by directing against it an electric discharge. The Licktenberg figures are examples of the result of such discharge and are produced as is well known when an electrode on or near the film emulsion is suddenly charged to a high potential. Study of these discharges and their peculiarities is copiously referred to in the literature, the general opinion being that the marks may be partially due to bombardment of the emulsion surface by ions of the adjacent gas, partially due to luminosity in the ionized gas, and partially to some sensitizing effect exercised on the emulsion by local intense electric fields. Such discharges have been used to operate surge recording devices for power line study, and a similar principle has been employed by Cooley 1,702,595 in transmission of facsimile photographs and the like.

In all of these devices of which I am aware, the electrode from which the discharge is caused is of electrically conducting material, and I find such conducting electrodes entirely unsuitable for the purpose of accurately recording sound.

This is due to the fact that the ionized air region adjacent to such a conducting electrode is in an unstable position; and if in any small portion of this region the ionization exceeds the average value of the region, the discharge will immediately concentrate itself at this portion momentarily.

As a result, a metallic electrode if formed in the obvious manner as a sharp plate whose edge is brought close to a sensitive film and in a direction transverse to the film motion, will mark on the film at any instant a line whose width exceeds the minimum requirements for proper recording of the higher frequencies.

Such a line will further be extremely ragged, due to the fact that all parts of the plate discharge energy into the adjacent gas at the same instant. The effect is rather that of a succession of small discharges, following one another at extremely brief intervals, and flickering out like flame tongues from the sharp edge.

If a film is passed by such a plate and continuous supply of electricity is fed to the plate, such as would be used in producing a blank or unmodulated sound track, the desirable smooth appearance of the track will not be obtained. On the contrary the blackened strip will be mottled with a number of extremely small parts, and when such a track is reproduced, large amounts of so-called background noises will result.

If a musical note is impressed on the sound system and thereafter applied to the plate as pulsating electrical energy, a succession of purely defined transverse lines will result. If now, the intensity of the musical note is increased, these lines will be blackened and the regions between them will be lighter, as should be the case. However, for increasing intensities, such a conducting plate will also widen the black lines and narrow the lighter spaces resulting in a very distorted sound when such a film is reproduced.

I find that if a plate of insulating or di-electric material is employed instead of a conducting plate, and if the dimension of this insulating plate and the applied electrical potentials are maintained within suitable operating limits, a sound track may be marked on the film which is free from all of the objectionable features experienced when conducting materials are used in the discharge electrode.

It is therefore, an object of my invention to use a plate of dielectric material for defining and maintaining an intense localized marking effect on the sound track region of a moving film, and I have termed this type of marking plate a dielectrode.

Such a dielectrode is capable of imparting to any portion of the adjacent ionized gas only a limited amount of energy and hence the instability of the ionized region is neutralized, and successive flickering discharges are eliminated. By thus producing a steady, even and balanced condition of ionization throughout the entire region adjacent to the plate, I have obtained a smooth uniform sound track in the unmodulated regions, and a correspondingly low level of background noise.

Such a dielectrode will further cause an extremely local concentration of the electrostatic field developed between its edge and the adjacent film, and this concentrated region will simultaneously be actively filled with ions which bombard the emulsion.

A further object accomplished by the dielectrode structure is to limit the effective region of the film at any one instant to an extremely narrow strip whose width does not vary substantially for a wide variation of impressed intensity.

A further object attained by the dielectrode structure is to permit intense overloads applied through the sound system, such as those occasioned by sudden loud and unexpected noises, without damage to the recording system or the film.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 shows a conventionalized recording system embodying my invention;

Fig. 2 is an enlarged detailed sectional view showing the dielectrode embodying my invention; and Figs. 3 and 4 show modified forms of the dielectrode.

The dielectrode structure 10 will be first described in combination with a conventional sound recording system shown in Fig. 1. This system comprises a modulated high frequency oscillator 11 which is acted upon by a microphone 12 in such a manner that modulated high frequency energy is supplied to primary coil 13 of a transformer 14. This modulated high frequency energy is induced in the secondary coil 15 with increased potential, and is applied to the dielectrode structure 10 and the back electrode or bed plate 16 through the medium of conductors 17 and 18. This causes an electrostatic field to be created in the space between the dielectrode structure 10 and back electrode 16 which is distorted in such a manner as to produce an extreme concentration of electrostatic field at a designated point in a manner to be hereinafter more fully described.

A film or emulsion 19, from any suitable source of supply, is passed over the back electrode or bed plate 16, immediately beneath the dielectrode structure 10. This film is drawn between the two electrodes at a uniformly constant speed by means of the rotation of a sprocket 20 for a purpose to be hereinafter described. As the sprocket 20 and its actuating mechanism is well-known in the art, no further details thereof are deemed necessary.

The dielectrode structure 10 is shown in enlarged form in Fig. 2 and will now be described in greater detail.

This dielectrode structure comprises a clamping member 21 formed of some suitable metallic conducting material, and a dielectrode 22 of dielectric material projecting therefrom. Dielectrode 22 may be held by clamping member 21 in any desirable manner, and as shown in Fig. 2, the dielectrode is frictionally maintained in a recess formed in the underside of the clamping member. This invention is not to be limited to the specific holding means shown, as it is to be understood that the dielectrode 22 can be held by clamp 21 in any desirable manner and with equal advantage.

The dielectrode 22 can be formed of any of the well-known insulators having a high dielectric constant, and consequent high impedance to the passage of alternating current. I have found that mica, glass, agate, and sapphire are admirably suited for this purpose, but any similar material of homogeneous structure may also be employed. If the structure is non-homogeneous, as in the case of agate having veins or striations, irregularly marked sound track will result.

It is also possible to employ materials which possess dielectric properties, and which are also partial conductors of electricity. Cellulose hydrate compounds, such as Cellophane, is such a material, and has been used with great success. Bakelite or other phenolic condensation products may likewise be employed either in a highly insulating or a partially conducting condition. Materials of this character may be advantageously employed in the form of dielectrode construction illustrated in Fig. 4. This will be hereinafter more fully described.

Partial conductors become objectionable as dielectrodes however, when the degree of conduction becomes sufficiently high so that unstable ionization action is possible at the exposed end of the dielectrode. Under these conditions, mottled sound track, irregular marks and marks of variable width result. It is therefore necessary when employing partial conductors with dielectric properties, to select for use only such materials having a relatively low degree of conduction. Such materials will also have a relatively high specific impedance.

The dielectrode 22 can be made in any desired form although the best markings on a sensitized film are obtained by employing a sharpened knife-like edge. This is clearly set forth in Fig. 2 wherein the dielectrode 22 is shown with the sharpened edge 23 closely overlying and facing the sensitized emulsion surface 24 of the film 19. The celluloid backing 25 of the film 19 is shown as being in contact with the back electrode or bed plate 16.

The dielectrode structure 10 can also be formed in a manner clearly shown in Fig. 3. In this form, the conducting metallic backing 26 has cemented thereto a dielectrode 27. Any suitable cement or adhesive may be used for this purpose. The dielectrode 27 is shown as being ground with two cylindrical concave surfaces 28 to define an extremely sharp edge 29, the dimensions of the edge presented to the film being laterally the dimension of the track desired, and longitudinally not greater than the dimension of the elemental image desired. This image, at a film speed of 90 feet per minute, the present standard recording speed, should be not over .001 inch to record the higher audible frequencies.

Fig. 4 shows another modified form of dielectrode construction in which partial conductors, such as hereinabove described, are utilized. In this form, the conducting backing or holder 30 is formed with a recess or slot in which the conducting blade 31 may be held by cementing or in any other convenient manner. A dielectric coating 32 of Cellophane or similar material is coated over the sides and exposed end of the blade 31, the dimensions of the end presented to the film being substantially not greater than the dimension of the elemental image desired.

The operation of this device is readily apparent from an inspection of Figs. 1 and 2. As will be seen from Fig. 1, sound in the air reaching the microphone 12 will cause modulated high frequency potentials to be applied between the dielectrode 22 and the back electrode 16, thereby affecting the film 19 passing between them by markings on the sound track.

Referring to Fig. 2, it will be seen that if a high and modulated high frequency potential is applied to the holder 21 and the back electrode 16 through the conductors 17 and 18, an electrostatic field will be created in the space between the opposed surfaces 33, 34 respectively of the holder 21 and the electrode 16. In practice the intensity of this field is at all times maintained below that at which appreciable ionization of the air would result. The projecting dielectrode 22 extends from the holder 21 into this electrostatic field, thereby causing a distortion of the field intensity, and producing an extreme concentration of electrostatic field between the sharpened tip 23 and the adjacent sensitive film emulsion 24.

In practice I find it desirable to maintain the spacing between the dielectrode tip 23 and the sensitive surface 24 of such dimensions that sharp intense marks result. Further, I find it an advantage to have the dielectrode tip sufficiently far from the film surface so that slight irregularities in emulsion thickness, dust particles and the like will not cause sufficient variations in the total applied stresses to result in irregularities or flaws in the sound track. In actual practice, this spacing may be on the order of a fraction of a thousandth of an inch, but may be increased under some conditions to more than a thousandth of an inch without disadvantageous performance. The minimum distance is dictated by irregularities in film surface and also by the fact that the intensity of marking seems to decrease somewhat when short spacings are used. The maximum desirable spacing is dictated by the width of the sharpest line desired. In general, an increase of distance will result in a slight broadening of the recorded lines, and in less sharp definition of their edges.

The electrical potential applied for satisfactory operation is governed by the thickness of the body of the dielectrode blade, and by its dielectric and partial conducting property as well as by the distance to which it projects from the conducting holder. In practice, when using any particular form of dielectrode structure and any adjustment or spacing of the blade with respect to the emulsion, a satisfactory operating potential may be experimentally determined in an empirical manner, by passing film through the device, adjusting the potential, and noting the blackness and other characteristics of the sound track produced thereby. As a practical matter, I have employed successfully in such devices modulated high frequency potential whose frequency was on the order of 200,000 cycles per second, and whose overall potential, as applied between the dielectrode holder and the back electrode, was on the order of two or three thousand volts.

I claim:

1. The method of marking a film having a single sensitized surface which comprises making said surface one face of an air gap, forming the other face of said air gap of dielectric material, passing energy through said film and said dielectric to ionize the air in said gap, and controlling the dimensions of said mark solely by the dimensions of said dielectric face.

2. The method of marking a photographic film which comprises the steps of creating an electrostatic field intersecting said film and terminating in a defined dielectric surface positioned above said film and parallel thereto, and regulating the intensity of said field to ionize substantially all of that portion of said field substantially normal to said film included between said surface and said film.

3. A recorder for impressing a sound track on a moving photographic film or the like which comprises a pair of conductive electrodes having opposed faces, an air gap between said faces, a barrier of susceptive material having negligible conductivity between each of said faces and said air gap, one of said barriers being said film, and means for maintaining the dimensions of said gap constant during the motion of said film.

4. A recorder for impressing a sound track on a moving photographic film or the like which comprises a pair of conductive electrodes having opposed faces, an air gap between said faces, and a barrier of susceptive material having negligible conductivity between each of said faces and said air gap, one of said barriers being said film, the other of said barriers being shaped to have a rectangular gap face having an elemental dimension parallel to the motion of the gap, the other dimension determining the width of the track desired.

5. A recorder for impressing a sound track on a moving photographic film or the like which comprises a pair of conductive electrodes having opposed faces, an air gap between said faces, a barrier of susceptive material having negligible conductivity between each of said faces and said air gap, one of said barriers being said film, and means for causing an electrical discharge to take place from one of said faces to the other to ionize the air in said gap.

6. A recorder for impressing a sound track on a photographic film which comprises means for moving said film, a dielectric having a defined surface parallel to and spaced apart from said film to form an air gap therebetween, and means for passing an alternating current through said film and said dielectric to completely ionize the air in said gap.

7. A recorder for impressing a sound track on a photographic film which comprises means for moving said film, a dielectric having a rectangular surface parallel to and spaced apart from said film to form an air gap therebetween, said surface having a smaller dimension parallel to the motion of said film and of elemental extent, the long dimension determining the width of the track desired, and means for passing an alternating current through said film and said dielectric to completely ionize the air in said gap.

8. A recorder for impressing a sound track on a moving photographic film or the like which comprises a dielectric applicator having a tip of elemental dimensions positioned above the sensitized surface of said film to form an air gap therebetween, and means for causing an electrical discharge from said film to said applicator to completely ionize the air in said gap.

9. A recorder for impressing a sound track on a photographic film having a sensitized surface and an unsensitized surface, consisting of a conductive basal electrode, means for moving said film over said basal electrode with said unsensitized surface in contact therewith, a recording electrode positioned at right angles to said film and presenting a sharp narrow edge to said sensitized surface to form an air gap opposite said basal electrode, the long dimension of said edge being normal to the direction of travel of said film, and means for energizing said electrodes to completely ionize said air gap.

10. A recorder for impressing a sound track on a photographic film having a sensitized surface and an unsensitized surface, consisting of a conductive basal electrode, means for moving said film over said basal electrode with said unsensitized surface in contact therewith, a recording electrode having a dielectric tip presenting a sharp narrow edge to said sensitized surface to form an air gap opposite said basal electrode, the long dimension of said edge being normal to the direction of travel of said film, and means for energizing said electrodes to completely ionize said air gap.

11. A recorder consisting of the combination of a photosensitive film with a recording blade having a linear edge positioned above said film to form a uniform air gap therewith, and means for passing energy through said film and said blade to completely ionize the shortest path from said edge to said film.

12. A recorder consisting of the combination of a photosensitive film with a recording blade having a linear edge of dielectric material positioned above said film to form a uniform air gap therewith, and means for passing energy through said film and said blade to completely ionize the shortest path from said edge to said film.

13. A recorder consisting of the combination of a moving photosensitive film with a recording blade having a linear edge of dielectric material positioned above said film to form a uniform air gap therewith, said edge extending in a direction normal to the direction of motion of said film, and means for passing energy through said film and said blade to completely ionize the shortest path from said edge to said film.

HERBERT E. METCALF.